(12) United States Patent
Bou Daher et al.

(10) Patent No.: US 11,514,922 B1
(45) Date of Patent: Nov. 29, 2022

(54) SYSTEMS AND METHODS FOR PREPARING REFERENCE SIGNALS FOR AN ACOUSTIC ECHO CANCELER

(71) Applicant: Bose Corporation, Framingham, MA (US)

(72) Inventors: Elie Bou Daher, Marlborough, MA (US); Cristian M. Hera, Lancaster, MA (US); Vigneish Kathavarayan, Marlborough, MA (US)

(73) Assignee: Bose Corporation, Framingham, MA (US)

(*) Notice: Subject to any disclaimer, the term of this patent is extended or adjusted under 35 U.S.C. 154(b) by 23 days.

(21) Appl. No.: 17/339,332

(22) Filed: Jun. 4, 2021

(51) Int. Cl.
| | |
|---|---|
| *G10L 21/0232* | (2013.01) |
| *H04R 1/02* | (2006.01) |
| *H04R 1/40* | (2006.01) |
| *H04R 3/12* | (2006.01) |
| *H04R 1/08* | (2006.01) |
| *G10L 21/028* | (2013.01) |
| *G10L 21/0208* | (2013.01) |
| *G10L 21/0216* | (2013.01) |

(52) U.S. Cl.
CPC ........ *G10L 21/0232* (2013.01); *G10L 21/028* (2013.01); *H04R 1/025* (2013.01); *H04R 1/08* (2013.01); *H04R 1/403* (2013.01); *H04R 3/12* (2013.01); *G10L 2021/02082* (2013.01); *G10L 2021/02163* (2013.01); *H04R 2499/13* (2013.01)

(58) Field of Classification Search
CPC .............. G10L 21/0232; G10L 21/028; G10L 2021/02082; G10L 2021/02163; H04R 1/025; H04R 1/08; H04R 1/403; H04R 3/12; H04R 2499/13

USPC .......................................................... 381/66
See application file for complete search history.

(56) References Cited

U.S. PATENT DOCUMENTS

| | | | |
|---|---|---|---|
| 9,967,661 B1 | 5/2018 | Hilmes et al. | |
| 11,211,061 B2* | 12/2021 | Li | H04R 3/005 |
| 2020/0413191 A1* | 12/2020 | Hera | H04R 3/02 |

OTHER PUBLICATIONS

International Search Report and the Written Opinion of the International Searching Authority, International Patent Application No. PCT/US2022/072726, dated Sep. 27, 2022, pp. 1-9.

* cited by examiner

*Primary Examiner* — Paul Kim
(74) *Attorney, Agent, or Firm* — Bond, Schoeneck & King, PLLC

(57) ABSTRACT

A method for preparing reference signals for an echo cancellation system disposed in a vehicle, comprising the steps of: receiving a plurality of drive signals, each drive signal being provided to an associated transducer of a plurality of acoustic transducers such that the associated acoustic transducer transduces the drive signal into an acoustic signal, filtering each drive signal with a respective filter of a plurality of filters to produce a plurality of filtered signals, wherein each of the plurality of filters approximates a transfer function from an associated acoustic transducer to a microphone disposed within the vehicle such that the plurality of filtered signals each estimate a respective acoustic signal at the microphone; summing together at least a subset of the plurality of filtered signals to produce a summed reference signal; and outputting the summed reference signal to an echo cancellation system.

20 Claims, 11 Drawing Sheets

SYSTEMS AND METHODS FOR PREPARING REFERENCE SIGNALS FOR AN ACOUSTIC ECHO CANCELER

BACKGROUND

The present disclosure generally relates to systems and methods for preparing reference signals for an acoustic echo canceler.

SUMMARY

All examples and features mentioned below can be combined in any technically possible way.

According to an aspect, a method for preparing reference signals for an echo cancellation system disposed in a vehicle includes the steps of: receiving a plurality of drive signals, each drive signal being provided to an associated transducer of a plurality of acoustic transducers such that the associated acoustic transducer transduces the drive signal into an acoustic signal, wherein the plurality of acoustic transducers are each positioned within the vehicle such that each acoustic signal is audible within a cabin of the vehicle; filtering each drive signal with a respective filter of a plurality of filters to produce a plurality of filtered signals, wherein each of the plurality of filters approximates a transfer function from an associated acoustic transducer to a microphone disposed within the vehicle such that the plurality of filtered signals each estimate a respective acoustic signal at the microphone; summing together at least a subset of the plurality of filtered signals to produce a summed reference signal; and outputting the summed reference signal to an echo cancellation system.

In an example, the method further includes the step of: summing a second subset of the plurality of filtered signals to produce a second summed reference signal; and outputting the second summed reference signal to the echo cancellation system.

In an example, the plurality of filters are selected from a set of filters according to a condition within a vehicle.

In an example, the condition is determined according to at least one of: seat position, window position, number of occupants, position of occupants, and door position.

According to another aspects, a method for preparing reference signals for an echo cancellation system disposed in a vehicle includes the steps of: receiving a plurality of drive signals, each drive signal being provided to an associated transducer of a plurality of acoustic transducers disposed within the vehicle such that the associated acoustic transducer transduces the drive signal into an acoustic signal; separating each of the plurality of drive signals into a plurality of frequency subbands; providing, for a first frequency subband of the plurality of frequency subbands, a first selection of the plurality of drive signals to the echo cancellation system as reference signals, wherein the first selection comprises at least a subset of the plurality of drive signals; and providing, for a second frequency subband of the plurality of frequency subbands, a second selection of the plurality of drive signals to the echo cancellation system as reference signals, wherein the second selection comprises a subset of the plurality drive signals, wherein the second selection comprises a subset of the plurality of drive signals, wherein the first selection and the second selection differ by at least one drive signal.

In an example, at least one of the first selection of the plurality drive signals and at least one of the second selection of the plurality of drive signals are summed before being provided to the echo cancellation system as reference signals.

In an example, a subset of the first selection of the plurality of drive signals are summed before being provided to the echo cancellation system.

In an example, before being provided to the echo cancellation system as reference signals, the first selection of the plurality of drive signals are filtered with a respective filter of a plurality of filters, wherein each of the plurality of filters approximates a transfer function from an associated acoustic transducer to a microphone disposed within the vehicle such that the first selection of the plurality of drive signals each estimate a respective acoustic signal, within the first subband, at the microphone.

In an example, wherein a subset of the first selection of the plurality of drive signals are summed before being provided to the echo cancellation system.

In an example, the plurality of filters are selected from a set of filters according to a condition within a vehicle.

According to another aspect, a non-transitory storage medium stores program code that, when executed by a processor, prepares reference signals for an echo cancellation system disposed in a vehicle, the program code, when executed, includes the steps of: receiving a plurality of drive signals, each drive signal being provided to an associated transducer of a plurality of acoustic transducers such that the associated acoustic transducer transduces the drive signal into an acoustic signal, wherein the plurality of acoustic transducers are each positioned within the vehicle such that each acoustic signal is audible within a cabin of the vehicle; filtering each drive signal with a respective filter of a plurality of filters to produce a plurality of filtered signals, wherein each of the plurality of filters approximates a transfer function from an associated acoustic transducer to a microphone disposed within the vehicle such that the plurality of filtered signals each estimate a respective acoustic signal at the microphone; summing together at least a subset of the plurality of filtered signals to produce a summed reference signal; and outputting the summed reference signal to an echo cancellation system.

In an example, the program code further includes the step of: summing a second subset of the plurality of filtered signals to produce a second summed reference signal; and outputting the second summed reference signal to the echo cancellation system.

In an example, the plurality of filters are selected from a set of filters according to a condition within a vehicle.

In an example, the condition is determined according to at least one of: seat position, window position, number of occupants, position of occupants, and door position.

According to another aspect, a non-transitory storage medium stores program code that, when executed by a processor, prepares reference signals for an echo cancellation system disposed in a vehicle, the program code, when executed, includes the steps of: receiving a plurality of drive signals, each drive signal being provided to an associated transducer of a plurality of acoustic transducers disposed within the vehicle such that the associated acoustic transducer transduces the drive signal into an acoustic signal; separating each of the plurality of drive signals into a plurality of frequency subbands; providing, for a first frequency subband of the plurality of frequency subbands, a first selection of the plurality of drive signals to the echo cancellation system as reference signals, wherein the first selection comprises at least a subset of the plurality of drive signals; and providing, for a second frequency subband of the plurality of frequency subbands, a second selection of the plurality of drive signals to the echo cancellation system as reference signals, wherein the second selection comprises a subset of the plurality drive signals, wherein the second selection comprises a subset of the plurality of drive signals, wherein the first selection and the second selection differ by at least one drive signal.

In an example, at least one of the first selection of the plurality drive signals and at least one of the second selection of the plurality of drive signals are summed before being provided to the echo cancellation system as reference signals.

In an example, a subset of the first selection of the plurality of drive signals are summed before being provided to the echo cancellation system.

In an example, before being provided to the echo cancellation system as reference signals, the first selection of the plurality of drive signals are filtered with a respective filter of a plurality of filters, wherein each of the plurality of filters approximates a transfer function from an associated acoustic transducer to a microphone disposed within the vehicle such that the first selection of the plurality of drive signals each estimate a respective acoustic signal, within the first subband, at the microphone.

In an example, wherein a subset of the first selection of the plurality of drive signals are summed before being provided to the echo cancellation system.

In an example, the plurality of filters are selected from a set of filters according to a condition within a vehicle.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

Echo cancelers implementing a large number channels are computationally expensive and have a slow convergence speed. In addition, if a third-party product is performing the echo cancellation, it might impose a restriction on the maximum number of reference channels due to software and/or hardware limitations. As a result, it is desirable to reduce the number of channels in the echo canceler without impacting its echo cancellation performance.

Various examples described in this disclosure are related to systems and methods for optimizing reference channels input to an acoustic echo canceler in a multi-channel system. Certain examples downselect a number of speaker channels into a smaller set of reference channels in order to improve performance, reduce computing costs, or to abide by the number of reference channels required by the echo canceler. In some examples, the speaker channels are prefiltered to approximate an acoustic signal received at a microphone before being summed. Certain examples separate the speaker channels into a set of subbands and downselect within the subbands to yield reference signals for the echo canceler.

Figure 1:
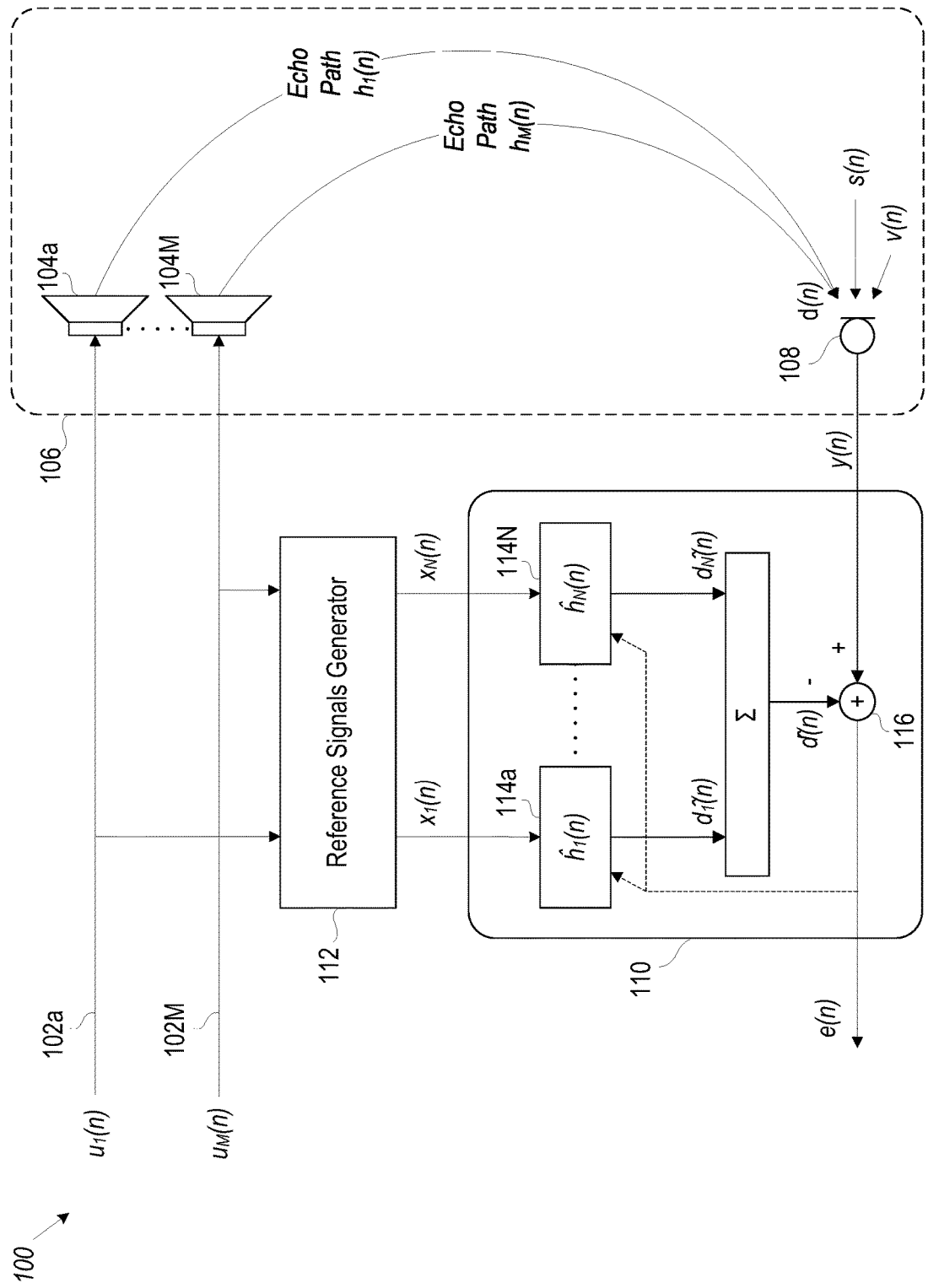
FIG. 1 depicts a schematic of an echo cancellation system, according to an example.

FIG. 1 shows an example multi-channel acoustic echo cancellation system 100. The speaker channels 102a-102M respectively provide drive signals $u_1(n), \ldots, u_M(n)$ to speakers 104a-104M (alternatively referred to acoustic transducers), where M is the total number of speaker channels, drive signals, and speakers. Drive signals $u_1(n)-u_M(n)$ are comprised of one or more program content signals, such as music, navigation commands, voice assistance, etc. Each speaker 102a-102M transduces the received drive signal $u_1(n)-u_M(n)$ into a respective acoustic signal that is audible within the vehicle cabin 106. (As used in this disclosure, speaker can be any transducer suitable for receiving an electrical signal and transducing it to an acoustic signal that is audible within a vehicle cabin.)

Echo cancellation system 100 further includes at least one microphone 108 disposed within the vehicle cabin 106 to receive a voice signal from at least one user seated within the vehicle. Due to its position, however, microphone 108 will receive signals besides the voice signal, including the acoustic signals produced by the by speakers 104a-104M and noise (e.g., road noise) within the cabin. The microphone signal y(n) can thus be expressed as follows:

$$y(n)=s(n)+d(n)+v(n), \quad (1)$$

where s(n) is the desired signal (typically a speech signal), v(n) is the noise and $$d(n) = \sum_{m=1}^{M} d_m(n)$$

is the combination of all echo signals (i.e., acoustic signals, generated by speakers 104a-104M as received at microphone 108).

Figure 2:
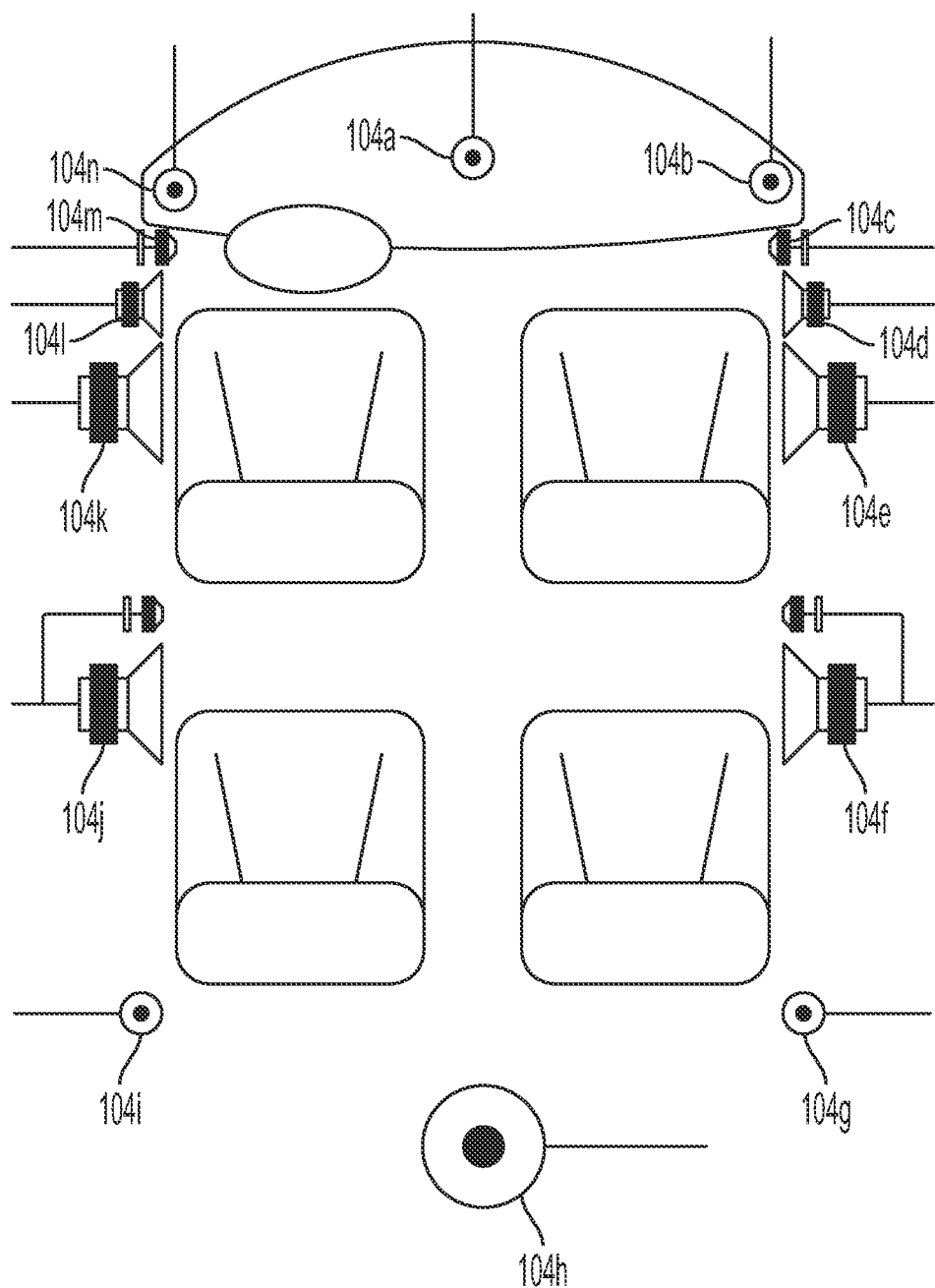
FIG. 2 depicts a schematic of a speaker system within a vehicle, according to an example.

In operation, echo canceler 110 is N-channel echo canceler and thus receives N reference signals that are selected from or otherwise based on drive signals $u_1(n)-u_M(n)$ according to reference signals generator 112, as will be described in more detail below. As described above, a high number of reference channels results in high computational complexity and slow convergence. Vehicles with high quality audio usually employ a large number of speakers. FIG. 2 shows an example of one such vehicle, where the number of speaker channels is equal to 14 (three dash speakers, three speakers in each of the front doors, one channel in each of the rear doors, two back speakers, and a woofer).

Thus, in the example of FIG. 1, reference signals generator 112 selects from the M speaker signals and/or combines them into N reference signals $x_1(n), \ldots, x_N(n)$, where $N \le M$, which are then supplied to the N-channel acoustic echo canceler. From the N signals, echo canceler 102 attempts to estimate the echo signal d(n) and subtract it from the microphone signal. Typically, echo canceler 110 employs a set of adaptive filters 114a-114N to estimate the echo paths $h_1(n), \ldots, h_N(n)$, such that the summed output of adaptive filters 114a-114N represents an estimate $\hat{d}(n)$ of the combined echo signal d(n). However, where echo canceler 110 receives a reduced number of reference signals—i.e., a number of reference signals less than the number of M speaker signals—adaptive filters 114a-114N attempt to identify modified echo paths that represent combinations of the original echo paths.

The combined echo signal $\hat{d}(n)$ is subtracted from microphone signal y(n) at subtractor 116 to yield an estimated speech signal s(n). Ideally, the estimated echo signal $\hat{d}(n)$ is identical to the actual echo d(n) such that the residual echo signal $e(n)=d(n)-\hat{d}(n)$ is equal to zero. Accordingly, reference signals generator 112 is optimized to downselect the M speaker channels to N reference channels in manner that minimizes e(n).

It should be understood that the drive signals $u_1(n)$-$u_M(n)$ can be the result of various upstream processing stages, including equalization, upmixing, routing, and/or soundstage rendering. Alternatively, or additionally, it should be understood that the drive signals $u_1(n)$-$u_M(n)$ can undergo additional processing before being transduced to acoustic signals by the speakers 104a-104M. Where drive signals undergo additional processing, such as equalization, before being provided to speakers 104a-104M, adaptive filters 114a-114N attempt to identify modified echo paths and the additional processing that the reference signals undergo before being transduced by speakers 104a-104M. Furthermore, it should be understood that the estimated speech signal s(n) can be subjected to further processing, such as with a post filter, to improve the estimated speech signal s(n).

One metric that can be used to evaluate the performance of the generated reference channels is the multi-coherence $C_{xy}$ between the combined references $x_1(n), \ldots, x_N(n)$ and the microphone signal y(n). Multi-coherence yields a value from zero to one, representing the level of linearity between the inputs and the output. In the absence of the noise signal v(n) and the desired signal s(n), a multi-coherence of one means that a linear relationship between the inputs and the output can be found and full cancellation of the echo signal d(n) can be achieved. As a result, a solution that maximizes the multi-coherence is deemed optimal.

Another metric that can be used to evaluate the performance of the generated references is the echo return loss enhancement (ERLE) when the generated signals are used as reference channels in a multi-channel acoustic echo canceler and the microphone signal is used as the input signal. ERLE can be used to assess the actual level of echo cancellation as well as the convergence speed of the adaptive filter when the echo paths are changed. While this disclosure will describe optimizing the reference channels in terms of a multi-coherence, it will be understood that any suitable metric for determining the performance of the echo canceler, to optimize the reference channel generation (e.g., ERLE), can be used in its place.

A number of methods for selecting, combining, and otherwise operating on drive signals $u_1(n)$-$u_M(n)$ to render the reference signals $x_1(n)$-$x_N(n)$ will be described below. These methods can be carried out by one or more processor, such as a digital signal processor, in communication with a non-transitory storing program code for the execution of the method. In some examples, the reference signals generator can be implemented in a processor(s) separate from the echo canceler, receiving drive signals to be transduced into acoustic signals and preparing, from these drive signals, reference signals input to the echo cancellation processor/device. For example, a processor can be added to a vehicle with an existing echo cancellation unit to generate reference signals for the existing unit. In alternative examples, the same processor that implements the functionality of the echo canceler can be used to generate the reference signals from the speaker drive signals.

In the first method, a subset of drive signals, consisting of N drive signals, are selected from the M drive signals, and are used to form the reference signals. In an example, the selection of drive signals N drive signals is chosen to maximize the aggregate multi-coherence between the selected inputs and the microphone signal as follows:

$$x(n) = \begin{bmatrix} x_1(n) \\ x_2(n) \\ \vdots \\ x_N(n) \end{bmatrix} = \arg\max_{\{S_i\} \in \mathbb{U}} C_{xy}(\{S_i\}, y(n)), \quad (2)$$

where $\{S_i\}$ is a subset of M drive signals and $\mathbb{U}$ is the universal set of all possible N-drive signal combinations. The total number of these combinations is equal to $$\binom{M}{N} = \frac{M!}{N!(M-N)!}. \quad (3)$$

Stated differently, the selection of drive signals that maximizes the multi-coherence metric is deemed optimal and is chosen to generate the reference channels.

FIG. 2 shows one example of these combinations where M=14 and N=5. Thus, in this example, speakers 104a-104M are implemented as speakers 104a-104n. Because N=5, five drive signals are selected from the fourteen available drive signals. In an example, the drive signals of speakers 104d, 104f, 104h, 104j, and 104l can be selected as the set of drive signals that provide the greatest aggregate multi-coherence between the selection and the microphone signal.

Typically, the selection of speaker drive signals that provide the greatest multi-coherence is performed in a design phase of the system. That is, while the audio system of the vehicle is being designed, various tests can be performed to determine which set of speaker drive signals offer the greatest multi-coherence with the microphone signal, a selection that is not altered after the vehicle is sold. However, in an alternative example, reference signals generator 112 can compare the multi-coherence of various selections of drive signals $u_1(n)$-$u_M(n)$ to select a set of N drive signals as reference signals, during runtime, that provide the best multi-coherence with the microphone signal. This set of N drive signals can be updated (e.g., periodically) as conditions within the cabin change. Additionally, or alternatively, the set of N drive signals can be updated (e.g., periodically) to account for changes in program content that is played through speakers 104a-104N (e.g., music, announcement, etc.).

In another example, the drive signals of groups of speakers can be summed into the same reference channel. The drive signals speakers in the same group are combined using summation as follows:

$$x_i(n) = \sum_{k \in \{U_i\}} u_k(n), \quad (4)$$

where $x_i(n)$ is the combined reference signal of the ith speaker group, $\{U_i\}$ is the set of speakers belonging to the ith group, and $u_k(n)$ are the constituent drive signals of the ith group.

For example, the speakers of FIG. 2 can be divided into four groups speakers: front-left, front-right, rear-left, and rear-right, and a center channel. More particularly, in this example, the font-left group comprises speakers 104k-104n; the front-right group comprises speakers 104b-104e; the rear-left group comprises speakers 104i and 104j; the rear-right group comprises speakers 104f and 104g; and the center channel (group) comprises speakers 104a and 104h. The drive signals of each of these groups can be summed together to form a single reference channel from each group.

Figure 3:
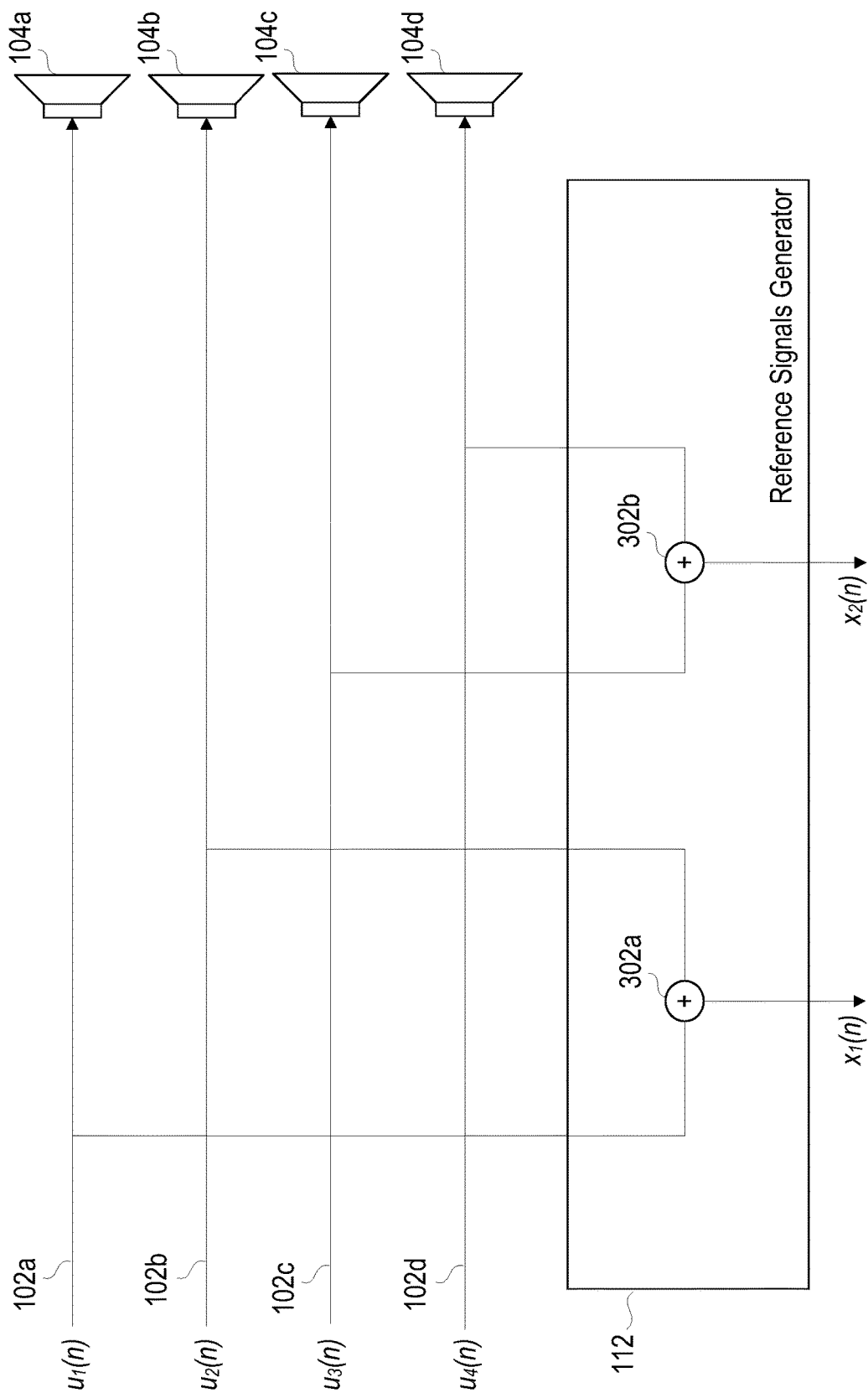
FIG. 3 depicts a schematic of a reference signals generator, according to an example.

Another example of this method is shown in the block diagram of FIG. 3. FIG. 3 is simplified example, in which M=4 and N=2, thus speakers 104a-104M comprise speakers 104a-104d. As shown, in this example, reference channel generator 112 comprises sum blocks 302a, 302b, which sum together the drive signals of speakers 104a-104b and the drive signals of speakers 104c-104d (i.e., drive signals $u_1(n)$-$u_4(n)$) to result in reference signals $x_1(n)$ and $x_2(n)$.

Generally, the speakers that are grouped are co-located within the cabin, that is they form a set of adjacent speakers that are located within particular or adjacent structures within the cabin (i.e., a door, a pillar, etc.). As described above, the groups can be selected to maximize the multi-coherence between the generated reference signals and the microphone signal.

It should be noted that this example generally assumes that the speakers in the same group with high mutual coherence do not have overlapping frequency ranges, as such overlapping frequency ranges can result in constructive or deconstructive addition between the drive signals. Thus, for example, the center channel group, which is comprised of tweeter speaker 104a and woofer speaker 104h can be added without frequency overlap. However, in most instances, this condition is dependent on the tuning of the audio system and cannot always be guaranteed.

Thus, where two speakers share similar content and have high mutual coherence, only one of the speakers needs to be included in the combined reference. However, it should be noted that speakers with low mutual coherence, even those that share the same frequency band, can be grouped. Accordingly, in a variation of the example of FIG. 2, certain speakers of speakers 104a-104M can be omitted from the summed groups of speakers. For example, returning to FIG. 2, to avoid grouping speakers with high mutual coherence within a similar frequency band, the font-left group comprises speakers 104k-104m; the front-right group comprises speakers 104c-104e; the rear-left group comprises speaker 104i; the rear-right group comprises speaker 104g; and the center channel (group) comprises speakers 104a and 104h. Compared to previously described groupings, speakers 104c, 104f, 104j, and 105n are excluded, to avoid summing speakers with high mutual coherence and overlapping frequency.

When selecting speakers to sum in groups, the speaker group combination with the highest aggregate multi-coherence to the microphone signal is generally deemed optimal. While the speaker drive signals that are summed and the groupings of the selected speaker drive signals (including groupings of all speaker drive signals) are generally selected during a design phase to maximize the multi-coherence between the generated reference signals and the microphone signal, in an alternative example, the speaker drive signals that are selected and the groupings of speaker signals can be adjusted during runtime to maximize the multi-coherence in view of changing conditions within the vehicle cabin and/or changing program content (e.g., music, announcements, etc.). Thus, the selection of speaker drive signals and the grouping of speaker drive signals can be updated (e.g., periodically) during runtime to maximize the multi-coherence between the reference signals and the microphone signal.

Figure 4:
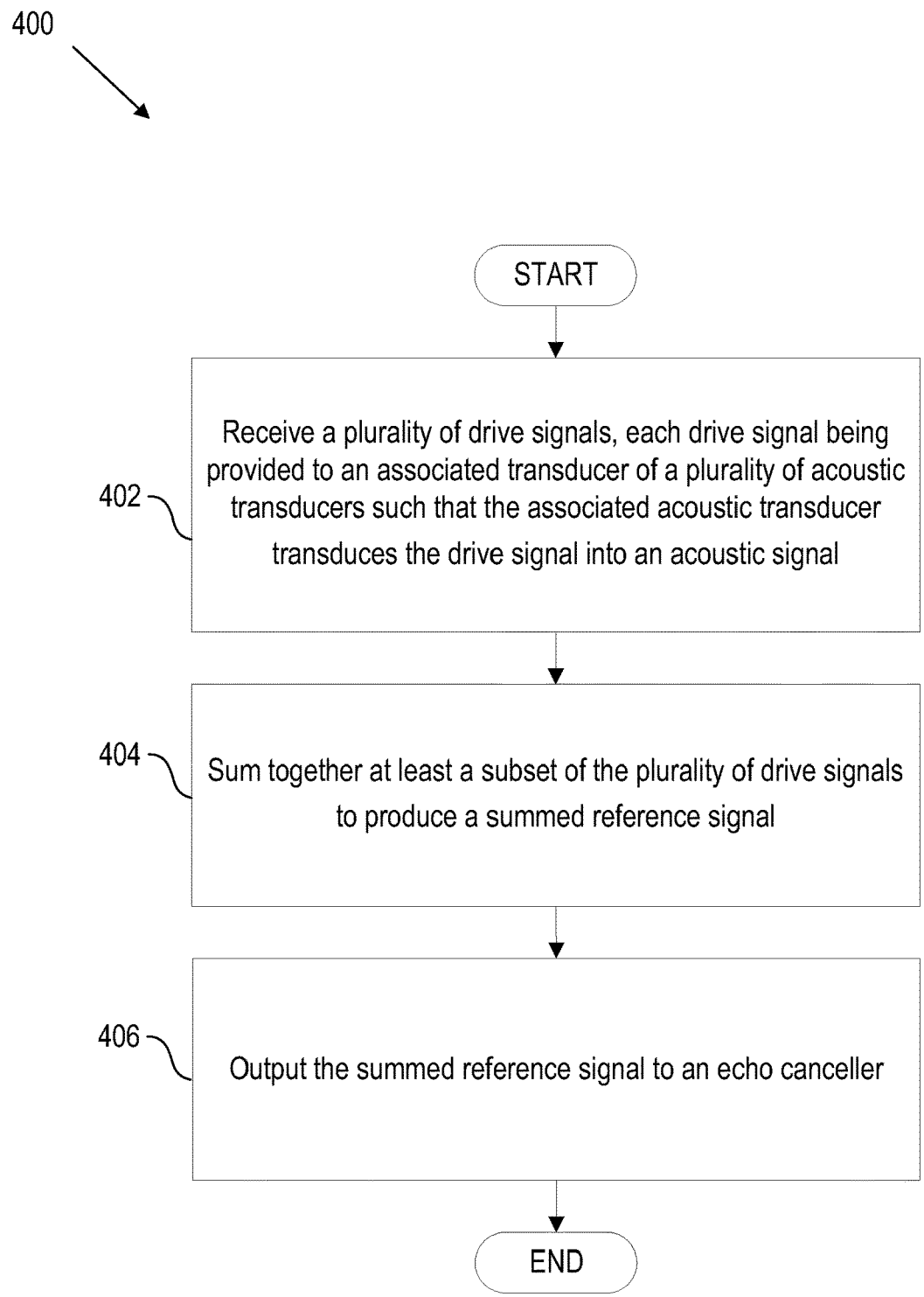
FIG. 4 depicts a flowchart of a method for generating reference signals for an echo canceler, according to an example.

FIG. 4 depicts a flowchart of a method 400 for generating reference signals according to the example of summing together drive signals described in conjunction with FIG. 3. It should be understood that method 400 can be implemented to provide reference signals for any suitable echo cancellation system, such as echo cancellation system 100.

At step 402, a plurality of drive signals are received, each drive signal being provided to an associated transducer of a plurality of acoustic transducers such that the associated acoustic transducer transduces the drive signal into an acoustic signal. The plurality of drive signals can be the result of upstream processing, such as equalization, upmixing, routing, and/or soundstage rendering, as such processes are known in the art. Furthermore, the drive signals can undergo further processing before being transduced by the acoustic transducer into an acoustic signal.

At step 404, at least a subset of the plurality of drive signals are summed to produce a summed reference signal. Typically, multiple subsets of drive signals are summed to produce multiple summed reference signals that are provided to the echo cancellation system in step 406. Which drive signals are summed with which—i.e., the drive signals that constitute any of summed subsets of drive signals—can be selected to maximize a metric such as a multi-coherence between the resulting summed reference signals and the microphone. Generally speaking, as described above, where certain speakers have high mutual coherence with another speaker and operate within the same frequency range (or at least overlapping frequency ranges), at least one of these speakers can be excluded from any subsets that are summed to produce the reference signals.

At step 406, the summed reference signals are output to an echo canceler, such as echo canceler 110, although any suitable echo canceler can be used. These reference signals are typically filtered by the echo canceler to result in an estimated echo signal that is subtracted from the microphone signal to render an estimated speech signal.

In an alternative example, the selected drive signals are first filtered before getting combined into a reduced number of signals as shown in the following equation.

$$x_i(n) = \sum_{k \in \{U_i\}} h_{0,k}(n) * u_k(n). \quad (5)$$

In this example, the difference between Equations (4) and (5) is filtering each drive signal $u_k(n)$ with the corresponding impulse response $h_{0,k}(n)$. $h_{0,k}(n)$ is chosen to maximize the multi-coherence between the generated drive signals and the microphone signal. In the absence of the desired signal s(n) and the noise signal v(n) and assuming no changes in the echo paths, $h_1(n) \ldots h_M(n)$, setting $h_{o,k}(n)=h_k(n)$, for $k=1, \ldots, M$, results in a multi-coherence equal to one, which makes this solution optimal. This is true for any number of reference channels as long as all speakers' drive signals are included when generating the reference signals. However, it is still generally desirable to group co-located speakers together to improve the tracking ability of the adaptive filter.

Figure 5:
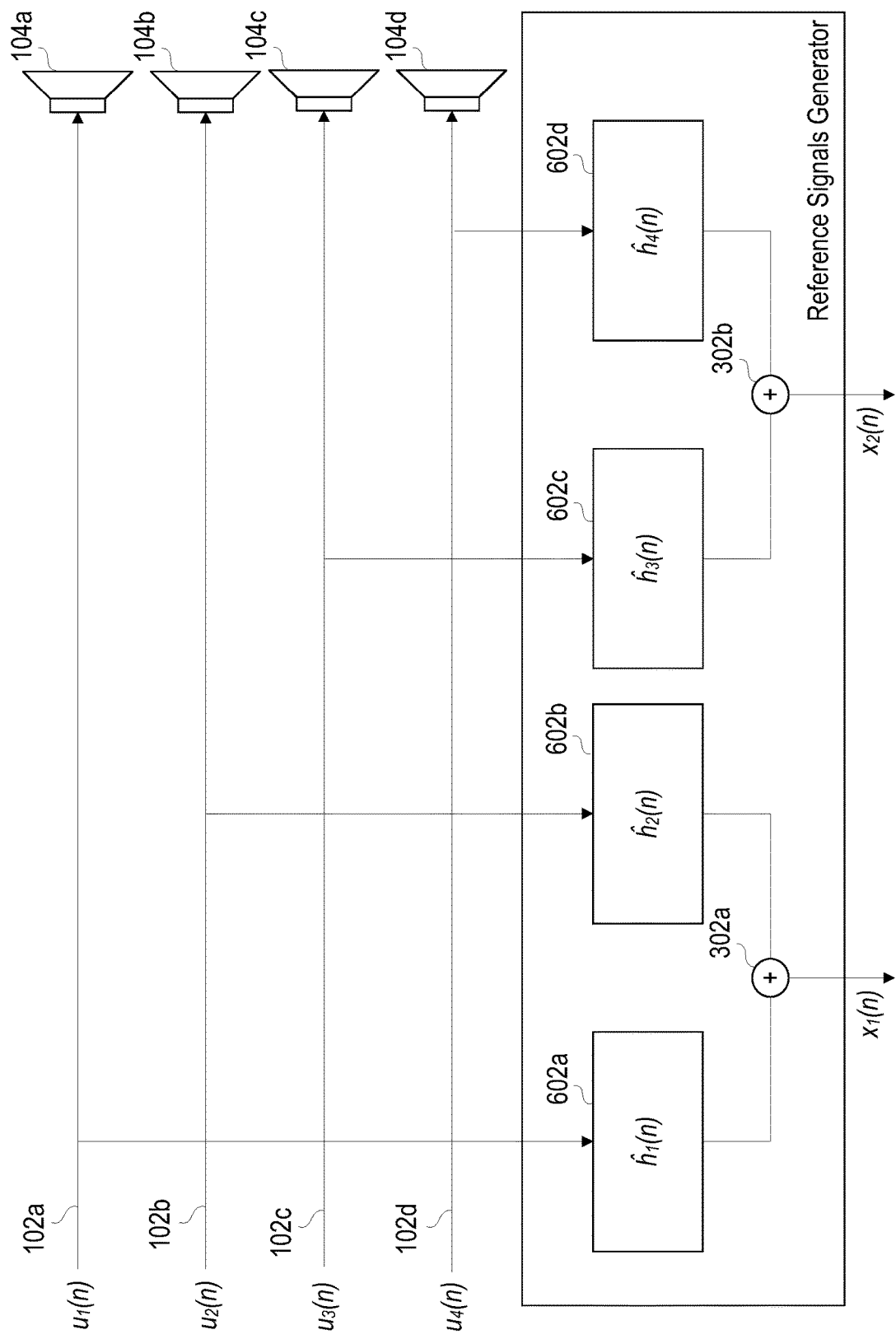
FIG. 5 depicts a schematic of a reference signals generator, according to an example.

Stated differently, in this example, each drive signal is filtered with a fixed filter that estimates the transfer function between the respective speaker (i.e., the speaker to which the drive signal is provided) and the microphone. FIG. 5, depicts an example implementation of filtered drive signals in accordance with equation 5. A set of fixed filters 602a-602N, here fixed filters 602a-602d, implement an estimate of the transfer function from the associated speaker to the microphone (i.e., the echo path). Thus, fixed filter 602a, which receives drive signal $u_1(n)$, implements an estimate of the transfer function from speaker 104a to microphone 108, such that the output of filter 602a represents an estimate of the acoustic signal produced by speaker 104a at microphone 108; likewise, fixed filter 602b, which receives drive signal $u_2(n)$, implements an estimate of the transfer function from speaker 104b to microphone 108, such that the output of filter 602b represents an estimate of the acoustic signal produced by speaker 104b at microphone 108, and so on.

This example effectively pre-filters the drive signals to generate the reference signals, thus accomplishing the function of filters 114a-114N before being input to the echo canceler 110 (but for all M drive signals as M>N). (In certain examples, not all drive signals are filtered, though filtering all drive signals generally renders the best results.) Accordingly, in this example, filters 114a-114N do not adapt to estimate the echo path from the speakers 104a-104M, but rather adapt to estimate the difference between the transfer functions of the fixed filters 602a-602N, as there is typically some difference between a priori determined transfer functions of the fixed filters and the actual echo path between each speaker 104a-104N and the microphone.

Indeed, in practice, the echo paths often change. To account for this, the transfer functions from all speakers to the microphone can be measured a priori for different conditions (e.g., seat position, window position, number of occupants, position of occupants, and door position). These measured transfer functions can then be combined to generate a single set of filters $h_{o,k}(n)$ that are applied in all conditions. In the example of FIG. 5, for example, the estimated transfer functions $\hat{h}_1(n)$-$\hat{h}_4(n)$ can each be the result of combining multiple transfer functions for a variety of different conditions within the cabin. Thus, estimated transfer function $\hat{h}_1(n)$ can be the combination of transfer functions from speaker 104a to the microphone in a variety of conditions; likewise, estimated transfer function $\hat{h}_2(n)$ can be the combination of transfer functions from speaker 104b to the microphone in a variety of conditions, and so on. This results in filters 602a-602N that work well in most conditions but do not adapt to adjust for changing conditions within the cabin.

Alternatively, a set of filters 602a-602N implementing a particular transfer function $h_{o,k}(n)$ can be stored for each condition within the cabin. These filters can be stored and implemented in response to the changing conditions within the cabin. Thus, in the example of FIG. 5, one set of filters 602a-602d are stored and implemented for one condition within the cabin (e.g., one seat position); whereas different set of prestored fixed filters 602a-602d, employing a different set of transfer functions suitable for a different condition, can be loaded and implemented for a different condition within the vehicle cabin. In this way, fixed filters 602a-602d suitably represent the transfer functions for the particular condition within the vehicle cabin. While this method generally produces better results than finding combined transfer functions that represent multiple conditions with the cabin, it requires additional storage and greater processing power to enact, as it requires receiving an input that is representative of the condition within the cabin, and loading and implementing the correct set of filters from a repository of filters.

Furthermore, where drive signals undergo additional processing, such as equalization, before being provided to speakers 104a-104M, fixed filters 602a-602d can further account for the additional processing. In this example, different fixed filters can be stored and loaded for different types of program content that use different equalization settings.

Figure 6:
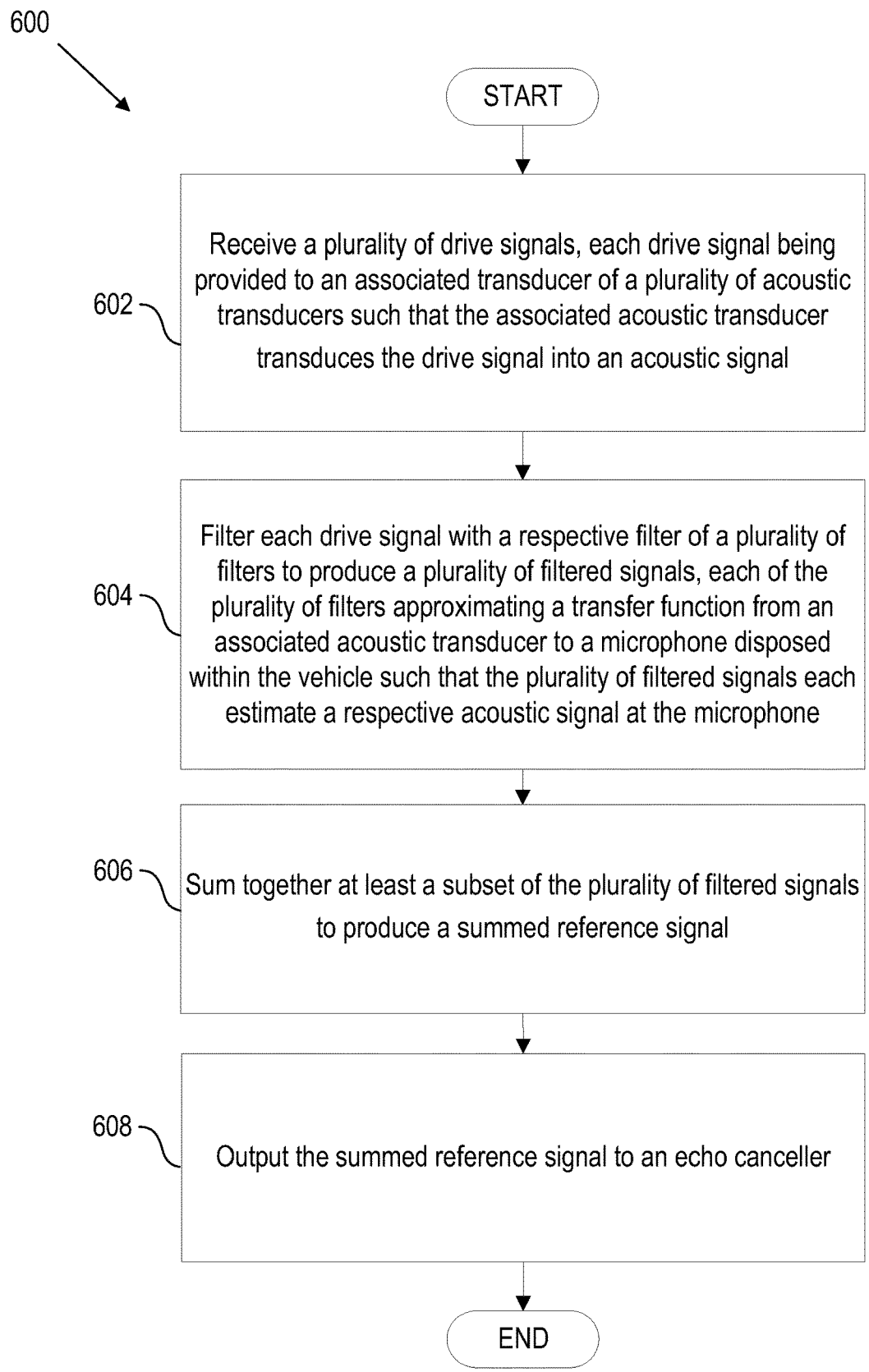
FIG. 6 depicts a flowchart of a method for generating reference signals for an echo canceler, according to an example.

FIG. 6 depicts a flowchart of a method 600 for generating reference signals according to the example described in conjunction with FIG. 5. It should be understood that method 600 can be implemented to provide reference signals for any suitable echo cancellation system, such as echo cancellation system 100.

At step 602, a plurality of drive signals is received, each drive signal being provided to an associated transducer of a plurality of acoustic transducers such that the associated acoustic transducer transduces the drive signal into an acoustic signal. The plurality of drive signals can be the result of upstream processing, such as equalization, upmixing, routing, and/or soundstage rendering, as such processes are known in the art. Furthermore, the drive signals can undergo further processing before being transduced by the acoustic transducer into an acoustic signal.

At step 604, each drive signal is filtered with a respective filter of a plurality of filters to produce a plurality of filtered signals, each of the plurality of filters approximating a transfer function from an associated acoustic transducer to a microphone disposed within the vehicle such that the plurality of filtered signals each estimate a respective acoustic signal at the microphone. The transfer function implemented by each filter can be the combined transfer function between the associated acoustic transducer (i.e., the acoustic transducer receiving the drive signal being filtered) and the microphone in a variety of conditions within the vehicle. Alternatively, a set of filters implementing transfer functions for a variety of conditions within the vehicle (e.g., seat position, window position, number of occupants, position of occupants, and door position) can be stored and loaded according to the present condition within the vehicle.

At step 606, at least a subset of the plurality of filtered signals are summed to produce a summed reference signal. This step is generally to reduce the number of reference signals provided to the echo canceler in order to diminish processing time or to abide by input constraints imposed by the echo canceler. It is generally desirable in this step to sum together groups of drive signals provided to co-located speakers.

At step 608, the summed reference signals are output to an echo canceler, such as echo canceler 110, although any suitable echo canceler can be used. These reference signals are typically filtered by the echo canceler to result in an estimated echo signal that is subtracted from the microphone signal to render an estimated speech signal.

While, the above-described systems and methods for generating reference signals were described for all frequencies, the optimal solution generated using these methods is not necessarily optimal at each frequency bin. For instance, a subset of speakers drive signals selected to optimize a multi-coherence between the reference signals and the microphone within the frequency range of 100 Hz and 600 Hz, will perform well for that range but poorly for another frequency range, such as between 5000 Hz and 5500 Hz. To account for this, the entire frequency spectrum can be partitioned into subbands and an optimal solution, among the methods described above, can be found for each subband. The objective is still to find a solution that maximizes the aggregate coherence in each of the subbands.

Figure 7:
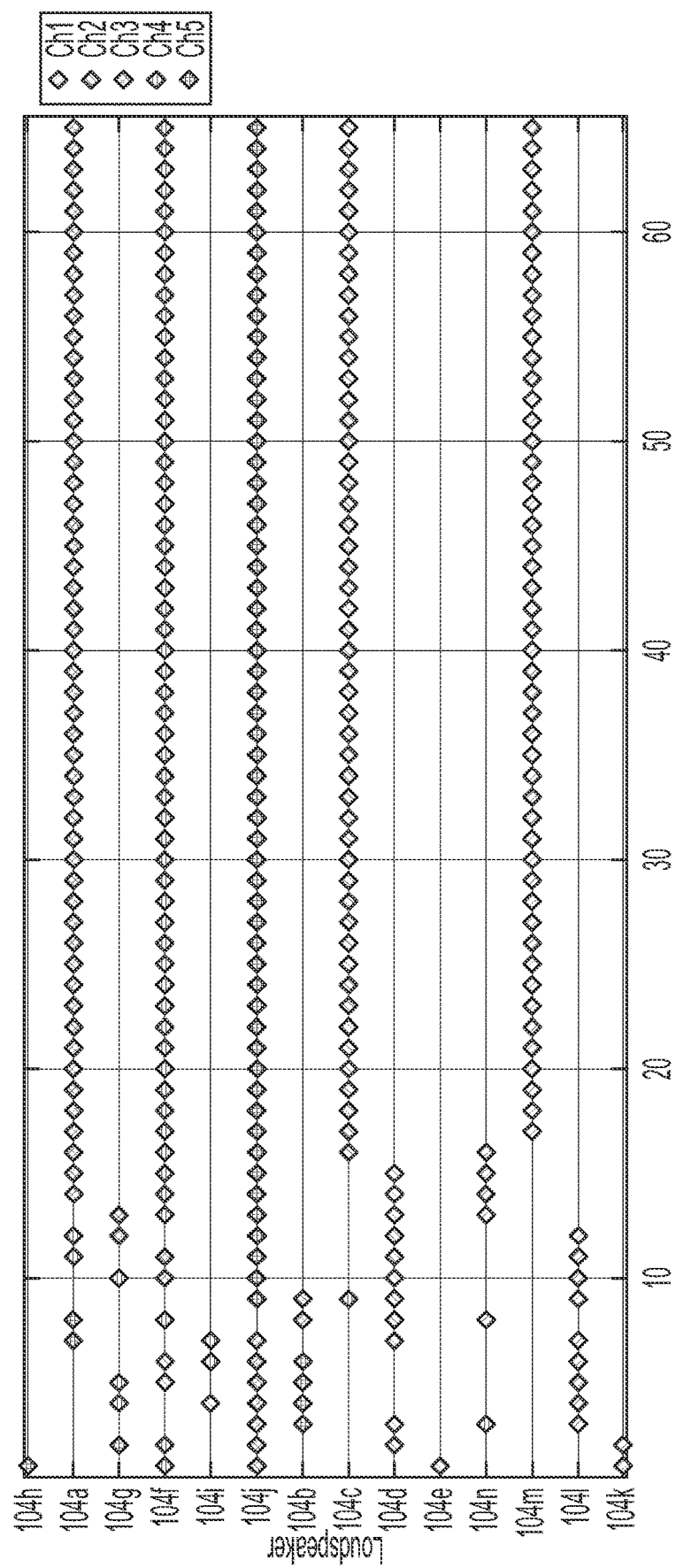
FIG. 7 depicts a plot of selected speaker signals across multiple subbands, according to an example.

For example, the optimal selection of speaker drive signals at the jth subband can be obtained as follows.

$$x^{(j)}(n) = \begin{bmatrix} x_1^{(j)}(n) \\ x_2^{(j)}(n) \\ \vdots \\ x_N^{(j)}(n) \end{bmatrix} = \arg\max_{\{S_i\} \in U} C_{xy}(\{S_i\}, y^{(j)}(n)), \quad (6)$$

where $x^{(j)}(n)$ is the generated reference signals vector in the jth subband and $y^{(j)}(n)$ is the microphone signal in the jth subband. $C_{xy}(\{S_i\}, y^{(j)}(n))$ is the aggregate multi-coherence between the selected speakers and the microphone signal in the jth subband. FIG. 7 shows an example of the selected subsets of speakers in each subband, where five reference signals, thus N=5, are found. In this example, the frequency spectrum was divided into 65 subbands and an optimal subset of five speakers was found for each subband. Of course, five reference signals and 65 subbands is only provided as an example. In alternative examples, any number of reference signals and any number of subbands can be used, according to the processing and/or input constraints of the echo canceler or the reference signal generator.

Likewise, an optimal solution can be obtained for each subband by summing groups of drive signals within each subband, as described in connection with FIGS. 3 and 4. For example, the drive signals can be grouped and summed into groups within each subband, to optimize the multi-coherence between the resulting reference signals and the microphone signal. For example, in the simple example of FIG. 3, in one subband, the drive signals of speakers 104a and 104b can be summed and the drive signals of speakers 104c and 104d can be summed; whereas, in a different subband, the drive signals 104a and 104c can be summed and 104b and 104d can be summed, in order to optimize the multi-coherence of each subband. Likewise, as described above, where there is high mutual coherence it can be beneficial to omit certain speaker drive signals where there is frequency overlap. Thus, the grouped speaker drive signals and the groups of speaker drive signals can be selected for each subband to optimize the multi-coherence within that subband.

In addition, filters can be selected within each subband, as described in connection with FIGS. 5 and 6, to optimize the multi-coherence within the subband. Different filters can be selected to maximize the multi-coherence with the subband. Thus at least one set of filters can be implemented for each subband. As described above, the filters for each subband can combine the transfer functions of a variety of conditions to arrive at transfer functions that work well for most conditions. Alternatively, a set of filters can be stored and loaded to account for changing conditions within the vehicle cabin, for each subband. Thus, one set of filters within one subband can be implemented for one condition, while another set of filters can be loaded from storage and implemented for a different condition within the vehicle cabin. Thus, the filters implemented can be optimized within each subband to maximize the multi-coherence between the reference signals and the microphone signal.

If the echo canceler is designed to receive input reference signals that are not subbanded, the subbanded signals can be synthesized to render the number of desired reference signals. Thus, in the example of FIG. 7, the optimized reference signals within the subbands can be summed across frequency to yield five reference signals. Alternatively, if the echo canceler is configured to receive subbanded signals, the optimal selected signals can be provided directly as subbanded reference signals.

In addition, the methods for optimizing the multi-coherence of the reference signal generation can vary across subbands. For instance, the filter and sum method (i.e., as described in connection with FIGS. 5 and 6) can perform well at low frequencies since the echo paths undergo smaller changes at low frequencies. However, this method suffers from performance degradation at higher frequencies due to the large changes in the echo paths at those frequencies. On the other hand, the speaker drive signal downselection method can perform well at high frequencies due to the limited number of speakers that can play at those frequencies. The optimal solution can therefore be a hybrid between different methods where solutions in different subbands bands are generated using different methods. Thus, in one example, optimal filters can be implemented at low frequency subbands, but, at high frequencies, a limited number of speaker drive signals can be selected that optimize the multi-coherence within those subbands. Indeed, it should be understood that the above-described methods can be implemented within each subband to provide reference signals within that subband, in any technically possible way.

Further, it should be understood that multiple microphones can be employed to capture the user's voice. In these cases, an acoustic echo canceler can be implemented for each microphone, and the resulting estimated speech signals output from the echo cancelers can be combined into a single output estimated speech signal. For example, if P microphones are used to capture a user's voice, a set of P echo cancelers, each associated with a respective microphone, can be used to cancel the echo in the associated microphone. Like echo canceler 110, the P echo cancelers operate by estimating the echo path from each speaker to the associated microphone. A respective reference signal generator (i.e., from P reference signal generators) can be used to select or combine the speaker signals to result in reference signals for each echo canceler. Each reference signal generator can employ the methods for selecting or combining the speaker signals as described above and in connection with FIGS. 1-7 and according to the method described below in connection with FIGS. 8A-8D.

In an alternative example, microphone signal y(n) can be the result of a combining signals output from an array of microphones, using a beamformer. The resulting combined microphone signal can be treated as a single microphone signal, and the methods for selecting or combining the speaker signals as described above and in connection with FIGS. 1-7 and according to the method described below in connection with FIGS. 8A-8D can be employed to cancel echo signals in the combined microphone signal.

FIG. 8 depicts a flowchart of a method 800 for generating reference signals according to the example described in conjunction with FIG. 7. It should be understood that method 800 can be implemented to provide reference signals for a suitable echo cancellation system, such as echo cancellation system 100.

At step 802, a plurality of drive signals are received, each drive signal being provided to an associated transducer of a plurality of acoustic transducers such that the associated acoustic transducer transduces the drive signal into an acoustic signal. The plurality of drive signals can be the result of upstream processing, such as equalization, upmixing, routing, and/or soundstage rendering, as such processes are known in the art. Furthermore, the drive signals can undergo further processing before being transduced by the acoustic transducer into an acoustic signal.

At step 804, each of the plurality of drive signals are separated into a plurality of frequency subbands. Any suitable method for subbanding the drive signals can be used. For example, each drive signal can be filtered with a parallel bank of passband filters, each filter of the bank of passband filters implementing cutoff frequencies to yield the different subbands of the drive signal.

At step 806, within each subband at least one reference signal is generated. In this step, the reference signal(s) generated within each subband can be generated using any combination of the methods described above. Various methods for generating the reference signals within each subband will be described below in connection with steps 806b-806d. In some examples, different methods can be used for different subbands to optimize the resulting reference signals and/or to reduce computing time.

Figure 8A:
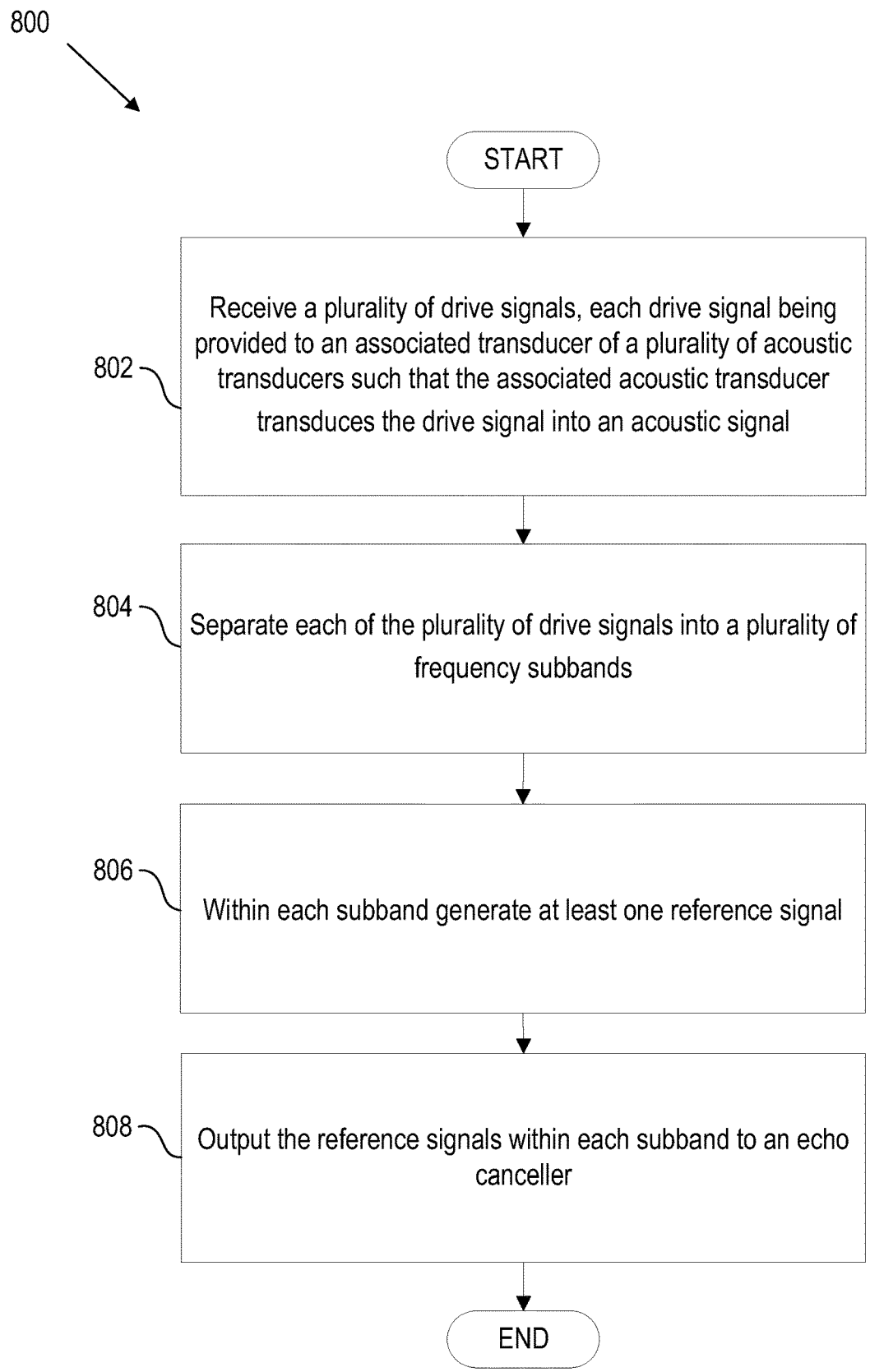
FIG. 8A depicts a flowchart of a method for generating reference signals for an echo canceler, according to an example.
Figure 8B:
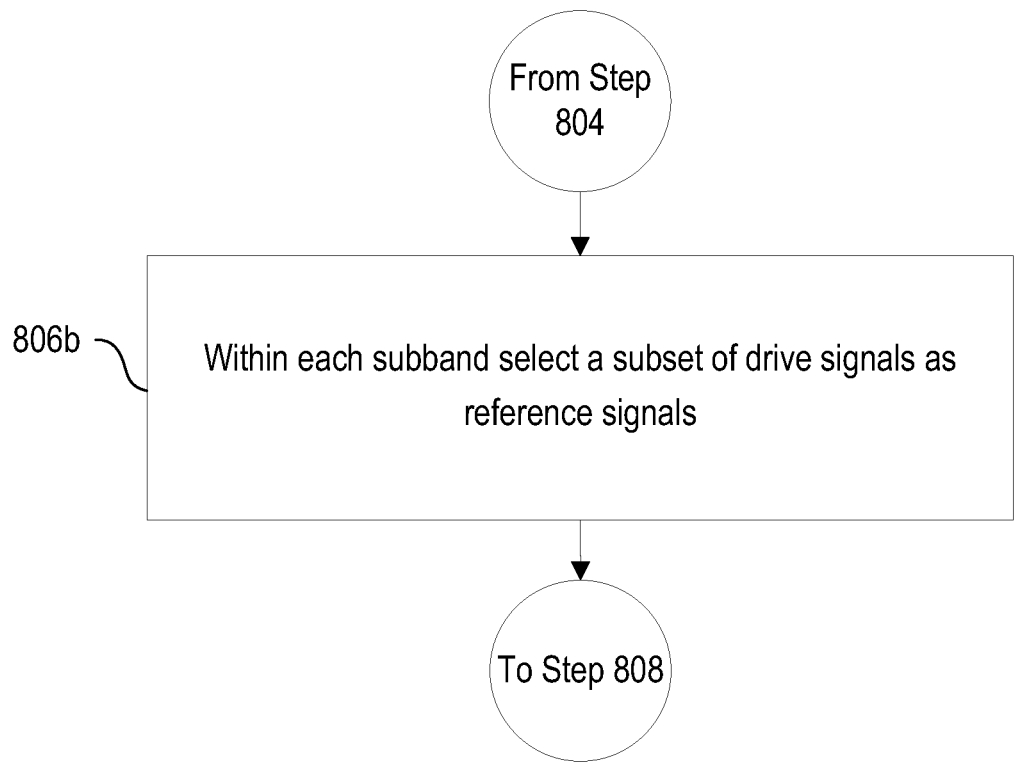
FIG. 8B depicts a flowchart of a method for generating reference signals for an echo canceler, according to an example.
Figure 8C:
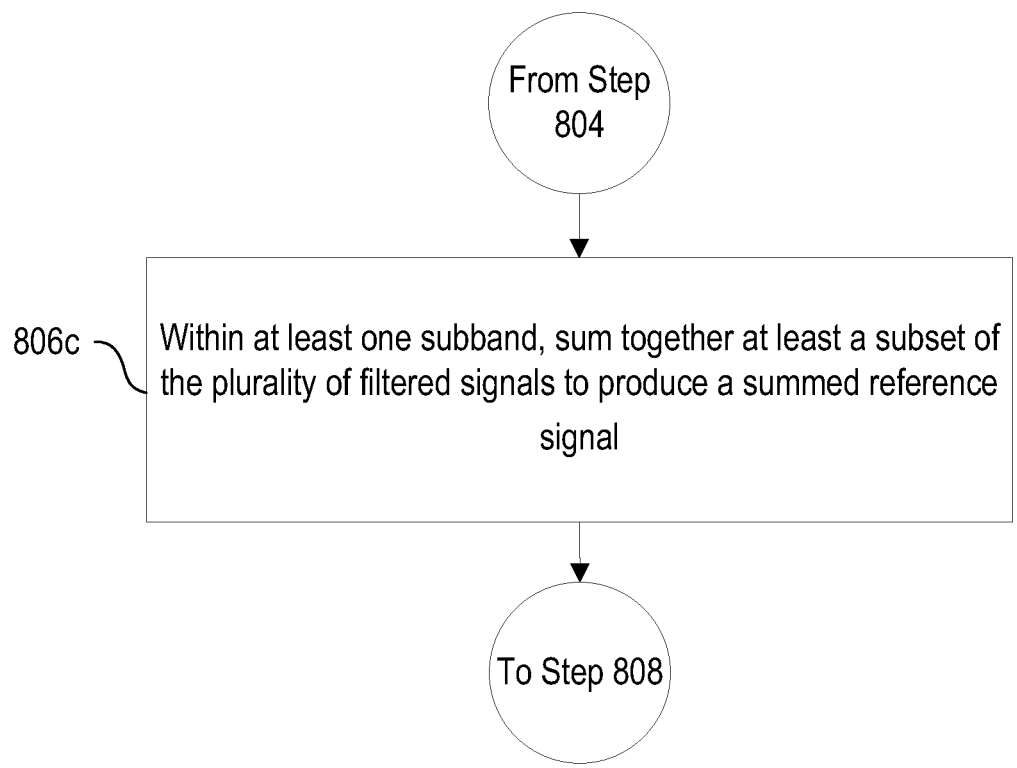
FIG. 8C depicts a flowchart of a method for generating reference signals for an echo canceler, according to an example.
Figure 8D:
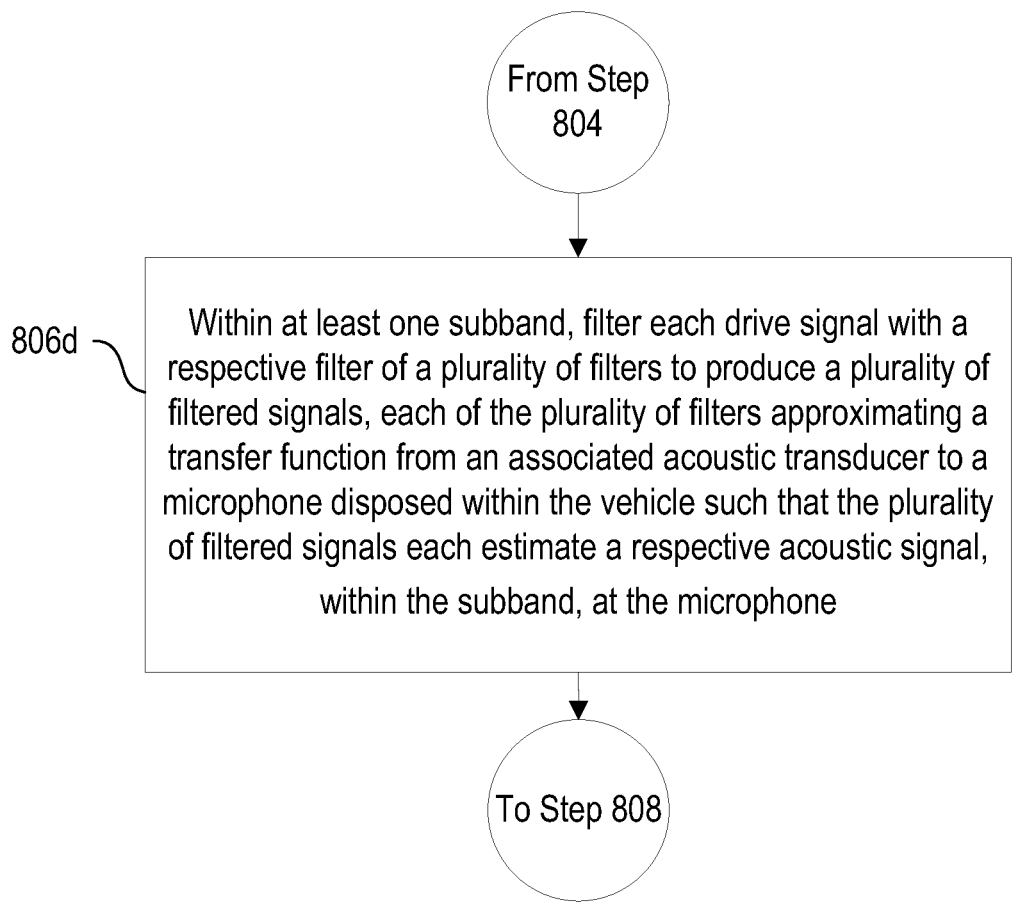
FIG. 8D depicts a flowchart of a method for generating reference signals for an echo canceler, according to an example.

In the first method, shown in FIG. 8B at step 806b, within each subband a subset of drive signals are selected as reference signals. In this example, different subsets of drive signals are selected for each subband, such that the subsets between at least two bands differ by at least one drive signal. Here, the subsets can be selected to maximize a multi-coherence between the selected reference signals and the microphone within each subband.

In a second method, at step 806c, within at least one subband, at least a subset of the plurality of filtered signals are summed to produce at least a summed reference signal. Typically, within a subset, multiple subsets of drive signals are summed to produce multiple summed reference signals that are provided to the echo cancellation system in step 808. Which drive signals are summed with which—i.e., the drive signals that constitute any of summed subsets of drive signals—can be selected to maximize a metric such as a multi-coherence between the resulting summed reference signals and the microphone. Generally speaking, as described above, where certain speakers have high mutual coherence with another speaker and operate within the same frequency range (or at least overlapping frequency ranges), at least one of these speakers can be excluded from any subsets that are summed to produce the reference signals, within the subband.

In a third method, at step 806d, within at least one subband, each drive signal is filtered with a respective filter of a plurality of filters to produce a plurality of filtered signals, each of the plurality of filters approximating a transfer function from an associated acoustic transducer to a microphone disposed within the vehicle such that the plurality of filtered signals each estimate a respective acoustic signal, within the subband, at the microphone. The transfer function implemented by each filter can be the combined transfer function between the associated acoustic transducer (i.e., the acoustic transducer receiving the drive signal being filtered) and the microphone in a variety of conditions within the vehicle. Alternatively, a set of filters implementing transfer functions for a variety of conditions within the vehicle (e.g., seat position, window position, number of occupants, position of occupants, and door position) can be stored and loaded according to the present condition within the vehicle. Furthermore, where the drive signals undergo additional processing, such as equalization, before being provided to speakers, the plurality of filters can further account for the additional processing. In this example, different filters can be stored and loaded for different types of program content that use different equalization settings.

At step 808, the reference signals within each subband are output to an echo canceler, such as echo canceler 110, although any suitable echo canceler can be used. These reference signals are typically filtered by the echo canceler to result in an estimated echo signal that is subtracted from the microphone signal to render an estimated speech signal.

While the above methods are typically selected during a design phase to maximize a metric such a multi-coherence between the reference signals and the microphone for each subband, in an alternative example these methods can be periodically updated or varied to account for changing conditions/program content within the vehicle cabin.

Further, while method 400 has been describe for a single microphone, the steps of method 400 can be repeated for multiple microphones, each with its own echo canceler, i.e., to generate reference signals for each echo canceler associated with each separate microphone. In an alternative example, the microphone signal can be the result of combining signals output from an array of microphones, using a beamformer. The resulting combined microphone signal can be treated as a single microphone signal and method 400 can be employed to cancel the echo signals in the combined microphone signal.

The mathematical equations provided in this disclosure are simplified for the purposes of illustrating the principles of the inventive aspects only and should not be deemed exclusive or limiting in any way. Furthermore, variations in the mathematical equations are contemplated and are within the spirit and scope of this disclosure.

Regarding the use of symbols herein, a capital letter, e.g., H, generally represents a term, signal, or quantity in the frequency or spectral domain, and a lowercase letter, e.g., h, generally represents a term, signal, or quantity in the time domain. Relation between time and frequency domain is generally well known, and is described at least under the realm of Fourier mathematics or analysis, and is accordingly not presented herein. Additionally, signals, transfer functions, or other terms or quantities represented by symbols herein may be operated, considered, or analyzed in analog or discrete form. In the case of time domain terms or quantities, the analog time index, e.g., t, and/or discrete sample index, e.g., n, may be interchanged or omitted in various cases. Likewise, in the frequency domain, analog frequency indexes, e.g, f, and discrete frequency indexes, e.g., k, are omitted in most cases. Further, relationships and calculations disclosed herein may generally exist or be carried out in either time or frequency domains, and either analog or discrete domains, as will be understood by one of skill in the art. Accordingly, various examples to illustrate every possible variation in time or frequency domains, and analog or discrete domains, are not presented herein.

The functionality described herein, or portions thereof, and its various modifications (hereinafter "the functions") can be implemented, at least in part, via computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of selecting or combining the reference signals. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A method for preparing reference signals for an echo cancellation system disposed in a vehicle, comprising the steps of:
   receiving a plurality of drive signals, each drive signal being provided to an associated transducer of a plurality of acoustic transducers such that the associated acoustic transducer transduces the drive signal into an acoustic signal, wherein the plurality of acoustic transducers are each positioned within the vehicle such that each acoustic signal is audible within a cabin of the vehicle;
   filtering each drive signal with a respective filter of a plurality of filters to produce a plurality of filtered signals, wherein each of the plurality of filters approximates a transfer function from an associated acoustic transducer to a microphone disposed within the vehicle such that the plurality of filtered signals each estimate a respective acoustic signal at the microphone;
   summing together at least a subset of the plurality of filtered signals to produce a summed reference signal; and
   outputting the summed reference signal to an echo cancellation system.

2. The method of claim 1, further comprising the step of:
   summing a second subset of the plurality of filtered signals to produce a second summed reference signal; and
   outputting the second summed reference signal to the echo cancellation system.

3. The method of claim 1, wherein the plurality of filters are selected from a set of filters according to a condition within a vehicle.

4. The method of claim 3, wherein the condition is determined according to at least one of: seat position, window position, number of occupants, position of occupants, and door position.

5. A method for preparing reference signals for an echo cancellation system disposed in a vehicle, comprising the steps of:
   receiving a plurality of drive signals, each drive signal being provided to an associated transducer of a plurality of acoustic transducers disposed within the vehicle such that the associated acoustic transducer transduces the drive signal into an acoustic signal;
   separating each of the plurality of drive signals into a plurality of frequency subbands;
   providing, for a first frequency subband of the plurality of frequency subbands, a first selection of the plurality of drive signals to the echo cancellation system as reference signals, wherein the first selection comprises at least a subset of the plurality of drive signals; and
   providing, for a second frequency subband of the plurality of frequency subbands, a second selection of the plurality of drive signals to the echo cancellation system as reference signals, wherein the second selection comprises a subset of the plurality drive signals, wherein the second selection comprises a subset of the plurality of drive signals, wherein the first selection and the second selection differ by at least one drive signal.

6. The method of claim 5, wherein at least one of the first selection of the plurality drive signals and at least one of the second selection of the plurality of drive signals are summed before being provided to the echo cancellation system as reference signals.

7. The method of claim 5, wherein a subset of the first selection of the plurality of drive signals are summed before being provided to the echo cancellation system.

8. The method of claim 5, wherein, before being provided to the echo cancellation system as reference signals, the first selection of the plurality of drive signals are filtered with a respective filter of a plurality of filters, wherein each of the plurality of filters approximates a transfer function from an associated acoustic transducer to a microphone disposed within the vehicle such that the first selection of the plurality of drive signals each estimate a respective acoustic signal, within the first subband, at the microphone.

9. The method of claim 8, wherein a subset of the first selection of the plurality of drive signals are summed before being provided to the echo cancellation system.

10. The method of claim 8, wherein the plurality of filters are selected from a set of filters according to a condition within a vehicle.

11. A non-transitory storage medium storing program code that, when executed by a processor, prepares reference signals for an echo cancellation system disposed in a vehicle, the program code, when executed, comprising the steps of:

receiving a plurality of drive signals, each drive signal being provided to an associated transducer of a plurality of acoustic transducers such that the associated acoustic transducer transduces the drive signal into an acoustic signal, wherein the plurality of acoustic transducers are each positioned within the vehicle such that each acoustic signal is audible within a cabin of the vehicle;

filtering each drive signal with a respective filter of a plurality of filters to produce a plurality of filtered signals, wherein each of the plurality of filters approximates a transfer function from an associated acoustic transducer to a microphone disposed within the vehicle such that the plurality of filtered signals each estimate a respective acoustic signal at the microphone;

summing together at least a subset of the plurality of filtered signals to produce a summed reference signal; and outputting the summed reference signal to an echo cancellation system.

12. The program code of claim 11, further comprising the step of:

summing a second subset of the plurality of filtered signals to produce a second summed reference signal; and outputting the second summed reference signal to the echo cancellation system.

13. The program code of claim 11, wherein the plurality of filters are selected from a set of filters according to a condition within a vehicle.

14. The program code of claim 13, wherein the condition is determined according to at least one of: seat position, window position, number of occupants, position of occupants, and door position.

15. A non-transitory storage medium storing program code that, when executed by a processor, prepares reference signals for an echo cancellation system disposed in a vehicle, the program code, when executed, comprising the steps of:

receiving a plurality of drive signals, each drive signal being provided to an associated transducer of a plurality of acoustic transducers disposed within the vehicle such that the associated acoustic transducer transduces the drive signal into an acoustic signal;

separating each of the plurality of drive signals into a plurality of frequency subbands;

providing, for a first frequency subband of the plurality of frequency subbands, a first selection of the plurality of drive signals to the echo cancellation system as reference signals, wherein the first selection comprises at least a subset of the plurality of drive signals; and providing, for a second frequency subband of the plurality of frequency subbands, a second selection of the plurality of drive signals to the echo cancellation system as reference signals, wherein the second selection comprises a subset of the plurality drive signals, wherein the second selection comprises a subset of the plurality of drive signals, wherein the first selection and the second selection differ by at least one drive signal.

16. The program code of claim 15, wherein at least one of the first selection of the plurality drive signals and at least one of the second selection of the plurality of drive signals are summed before being provided to the echo cancellation system as reference signals.

17. The program code of claim 15, wherein a subset of the first selection of the plurality of drive signals are summed before being provided to the echo cancellation system.

18. The program code of claim 15, wherein, before being provided to the echo cancellation system as reference signals, the first selection of the plurality of drive signals are filtered with a respective filter of a plurality of filters, wherein each of the plurality of filters approximates a transfer function from an associated acoustic transducer to a microphone disposed within the vehicle such that the first selection of the plurality of drive signals each estimate a respective acoustic signal, within the first subband, at the microphone.

19. The program code of claim 18, wherein a subset of the first selection of the plurality of drive signals are summed before being provided to the echo cancellation system.

20. The program code of claim 18, wherein the plurality of filters are selected from a set of filters according to a condition within a vehicle.

\* \* \* \* \*